United States Patent
Bauer et al.

(10) Patent No.: US 6,895,320 B2
(45) Date of Patent: May 17, 2005

(54) ELECTRONICALLY ACTUATED DRIVE TRAIN IN A MOTOR VEHICLE AND AN ASSOCIATED OPERATING METHOD

(75) Inventors: Wolf-Dietrich Bauer, Stuttgart (DE); Christian Michael Mayer, Jakarta (ID); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/209,947

(22) Filed: Aug. 2, 2002

(65) Prior Publication Data

US 2003/0033069 A1 Feb. 13, 2003

(30) Foreign Application Priority Data

Aug. 3, 2001 (DE) .......................................... 101 38 119

(51) Int. Cl.⁷ ............................................. G06F 19/00
(52) U.S. Cl. ........................................... 701/54; 701/65
(58) Field of Search ................................ 701/1, 54, 65, 701/81, 123, 207, 200; 477/110, 121

(56) References Cited

U.S. PATENT DOCUMENTS

| 4,542,460 A | * | 9/1985 | Weber ........................... 701/1 |
| 4,866,622 A | * | 9/1989 | Dreher et al. |
| 5,627,752 A | | 5/1997 | Buck et al. |
| 5,772,556 A | | 6/1998 | Tinschert et al. |
| 6,095,945 A | * | 8/2000 | Graf ............................ 477/97 |
| 6,188,945 B1 | * | 2/2001 | Graf et al. ..................... 701/58 |

FOREIGN PATENT DOCUMENTS

| DE | 43443699 A1 | 7/1995 |
| DE | 19511866 A1 | 10/1996 |

* cited by examiner

Primary Examiner—Gary Chin
(74) Attorney, Agent, or Firm—Crowell & Moring LLP

(57) ABSTRACT

A method for operating an electronically actuated drive train in a motor vehicle includes the steps of determining drive control signals for actuating a drive unit and gearbox control signals for actuating a manual gearbox from a power request of the driver of the vehicle, providing a predefined or predefinable driving style which can be selected from a range from minimum energy or fuel consumption up to maximum power output, taking the driving style into account in the determination of the drive control signals and the gearbox control signals, taking the local position of the motor vehicle into account in the determination of the drive control signals and the gearbox control signals.

15 Claims, 1 Drawing Sheet

ELECTRONICALLY ACTUATED DRIVE TRAIN IN A MOTOR VEHICLE AND AN ASSOCIATED OPERATING METHOD

This application claims the priority of German Patent Document No. 101 38 119.0, filed Aug. 3, 2001, the disclosure of which is expressly incorporated by reference herein.

BACKGROUND AND SUMMARY OF THE INVENTION

The present invention relates to an electronically actuated drive train in a motor vehicle, in particular in a utility vehicle, for example lorry, and a method for operating such a drive train.

A drive train usually comprises a manual gearbox, a drive unit and a power request input device. The manual gearbox can be electronically actuated with gearbox control signals. The drive unit may be, for example, an internal combustion engine which has a drive connection to the manual gearbox, and can be electronically actuated with drive control signals. The power request input device may be, for example, an accelerator pedal or a joystick, which can be activated by the driver of the vehicle, and generates power request signals. In addition, a central processing unit is assigned to the drive train. The central processing unit is connected to the power request input device, to the manual gearbox and to the drive unit, and determines drive control signals and gearbox control signals from the incoming power request signals and actuates the manual gearbox and the drive unit. In order to determine the gearbox control signals and the drive control signals, the central processing unit can access, for example, values which are stored in characteristic diagram forms and which define a predetermined gear-changing strategy.

DE 195 11 866 A1 discloses an arrangement for cyclically adapting a characteristic curve for switching gears in an automatic gearbox of a motor vehicle. In this known arrangement, correction values are determined in accordance with a switching strategy which functions by means of an algorithm which forms relationships between external influencing variables, and by evaluating measured actual values of these influencing variables. As a function of these determined correction values, the characteristic curve can then be adapted both in the direction of the coordinate which specifies a travelling-speed-dependent parameter and in the direction of the coordinate which specifies a parameter which is assigned to the engine torque.

DE 43 44 369 A1 discloses the limiting of the driving power of a vehicle drive with respect to the energy consumption. This method supports the driver in the optimum utilization of the energy supply. This is of particular significance especially for electric vehicles. At the start of a journey, a journey computer is informed of the route which is to be covered. The journey computer can then determine an acceptable route consumption by reference to the available energy supply, from which consumption a predefined value is determined taking into account driving resistances and other influencing factors. The predefined value correspondingly actuates a device for limiting the driving power. In one particular refinement of this method, the journey computer can also access a navigation system which has three-dimensional maps of the route to be covered. The journey computer then decomposes the overall route into suitable partial routes and assigns separate predefined values to them for the limitation of the driving power. In this way, for example, an increase in energy consumption for overcoming a positive gradient can be taken into account. It is of particular significance here that for the individual partial routes the known method always defines maximum values for the available driving power which must not be exceeded if the aimed-at overall route is to be covered without replenishing the energy supply.

The present invention is concerned with the problem of specifying, for an electronically actuated drive train, possible ways of reducing the energy consumption of the drive train when implementing the power request.

This problem is solved according to the invention by means of a method and a device having the features of the claimed invention.

The invention is based on the general idea of taking into account a predefinable or predefined driving style and the local position of the vehicle in the determination of the drive control signals and the gearbox control signals. The driving style can be selected from a range from minimum energy or fuel consumption up to maximum power output, or any desired compromises between these two extreme driving styles. By this driving style, it is possible to find the optimum combination of gearbox control signal and drive control signal for any power request. The current vehicle position can be matched, for example, to three-dimensional maps of the surroundings of the vehicle, that is, maps with altitude information, in order to take into account the relevant conditions. By taking into account the vehicle position, it is also possible to include route-related peripheral conditions in the determination of the combination of gearbox control signal and drive control signal which is optimized in terms of energy consumption. As a result, the energy consumption over relatively long routes can be additionally reduced. For example, it is possible to take into account the presence of a positive incline or of a negative incline of the road in the determination of the control signals.

In DE 43 44 369 A1, the driving power is limited by maximum values in a consumption-oriented fashion. The maximum values are determined from the information on the surroundings of individual partial routes of the overall route and must not be, or should not be, exceeded by the vehicle in order to cover the entire distance. In the present invention, on the other hand, the drive train is actuated from the outset in such a way that a driving style which is optimized in terms of fuel consumption is obtained within the predetermined driving style. The conditions of the more immediate surroundings are taken into account, but not the overall route which does not need to be known to the drive train according to the invention.

In a significant embodiment, the local position of the vehicle is taken into account in conjunction with three-dimensional maps of the current surroundings of the vehicle in the sense of a predictive driving style in the determination of the drive control signals and the gearbox control signals. For example, the energy or fuel consumption can be reduced by avoiding unnecessary gear changes, for example, just before a positive gradient or before a negative gradient.

Preferably, characteristic road properties, which are taken into account in the determination of the drive control signals and the gearbox control signals, can be determined from the three-dimensional maps. The following road properties, which can be taken into account cumulatively or alternatively, are of particular significance:

The distance between the current location of the vehicle and a change in the road gradient, for example, a positive gradient or a negative gradient. As already mentioned, in this way unnecessary gear changes and acceleration operations or braking operations can be avoided.

The distance between the current vehicle location and a change in the direction of the road, for example, a bend or junction. By taking into account these road properties, it is possible, for example, to avoid an unnecessary acceleration before a bend or junction if this bend or junction is assigned a maximum speed which would be exceeded by the acceleration operation.

The distance between the current vehicle position and a stopping point, for example a crossroads, a destination or an intermediate destination. Here too, unnecessary acceleration operations can be avoided in order to reduce the fuel or energy consumption.

The distance from a change in the permitted speed, for example, at an entry to a locality. Here too, the effect of taking into account this property of the road is to avoid unnecessary acceleration operations and fuel consumption.

The vehicle position can be taken into account in the determination of the drive control signals and the gearbox control signals, for example, by displacing a gear-changing time forwards or backwards. For example, when a correspondingly large positive incline is approached, it may be advantageous, even before the beginning of the incline, to select a relatively low gear in order, for example, to lose less speed in comparison to a gear-changing operation which takes place on the positive incline. As a result, the fuel consumption can be reduced.

Alternatively, or in addition, the power request of the driver of the vehicle can be smoothed and/or partially or completely ignored. The power request may be smoothed if the power request has excessive fluctuations.

Furthermore, it is possible, for example on a negative gradient, to ignore an additional power request if, for example, a permitted maximum speed has already been reached.

Likewise, it is possible to reduce the power output of the drive train before the start of a negative gradient in order to avoid or decrease braking operation for the coming negative gradient.

Furthermore, it is possible, given a constant power request, to change the power of the drive unit. In processor-controlled internal combustion engines, it is possible to increase or decrease the parameters relating to power by adjusting the control. For example, this can be done by changing the injection quantity, the injection pressure, the injection time, the position of the throttle valve, the ignition time by activating or deactivating individual cylinders and the like. For example, it may be appropriate to select the drive power of the drive train as a function of the current weight of the vehicle. A lorry, which is configured for transporting a load of 40 tonnes, has too much drive power in the unloaded state and is "overpowered". By reducing parameters of the engine power electronically, the power can be balanced in order to reduce the consumption of fuel. Likewise, it is possible to briefly increase the parameters of the power of the internal combustion engine in order to overcome relatively large positive gradients.

It goes without saying that the features which have been mentioned above and are to be explained below can be used not only in the respectively specified combination but also in other combinations or alone without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
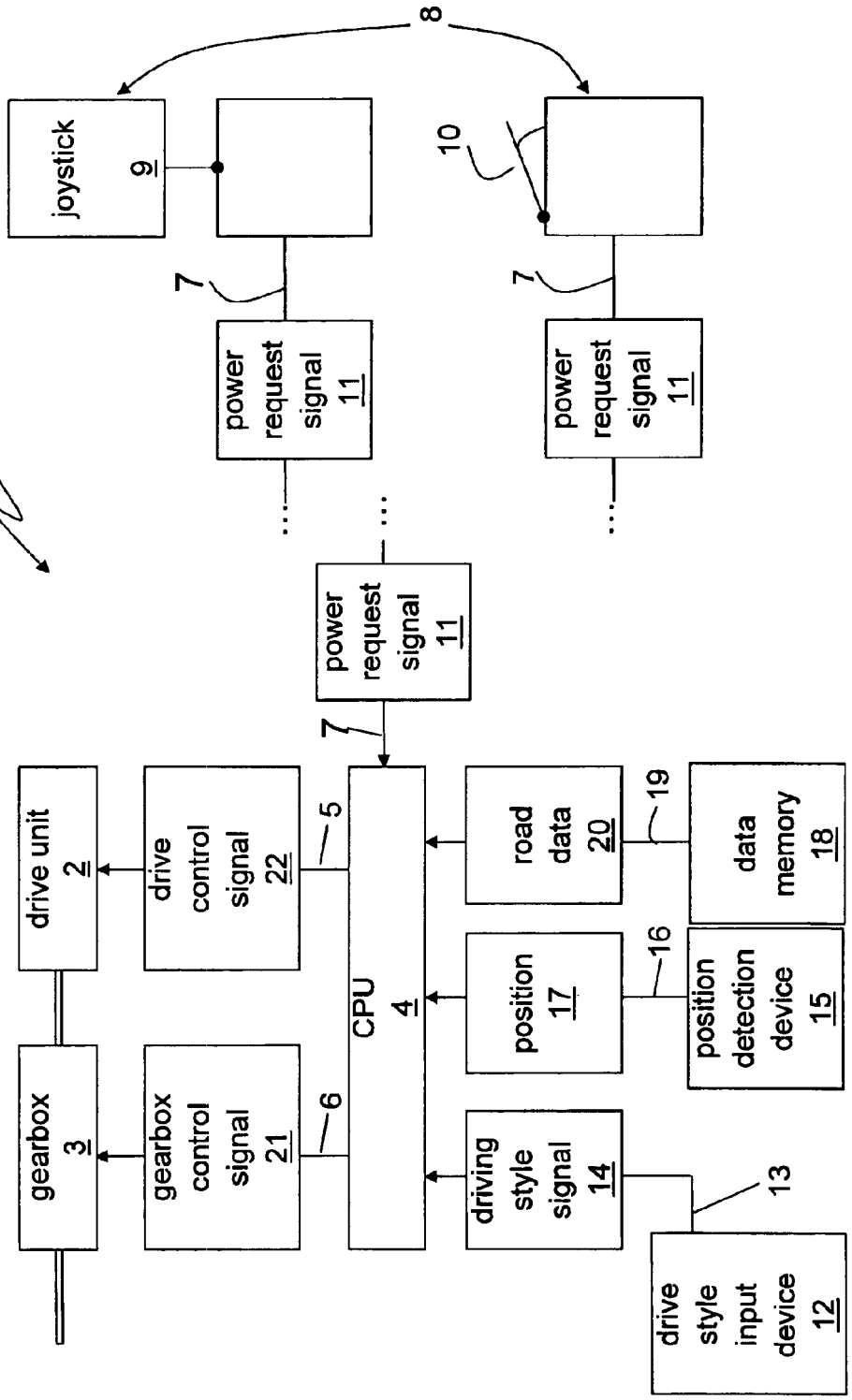
FIG. 1 shows a circuit diagram-like basic representation of the drive train according to the invention.

In FIG. 1, an electronically actuated drive train 1 according to the invention comprises a drive unit 2, for example an internal combustion engine, and a manual gearbox 3 which has a driven connection to it. The drive train 1 is installed in a motor vehicle (not shown), in particular utility vehicle, for example lorry. A central processing unit 4 of the drive train 1 is connected via a drive control line 5 to the drive unit 2, and via a gearbox control line 6 to the manual gearbox 3. Furthermore, the central processing unit 4 is connected via a power request signal line 7 to a power request input device 8. Two different embodiments of this power request input device 8 are illustrated in FIG. 1, and it is possible to use the embodiments cumulatively or alternatively. The power request input device 8 which is illustrated at the top in FIG. 1 has a joystick 9, while the power request input device 8 which is illustrated below it has an accelerator pedal 10. The driver of the vehicle can activate the respective power request input device 8 in order to generate a power request signal 11.

The central processing unit 4 is also connected to a driving style input device 12 from which the central processing unit 4 receives a driving style signal 14 via a driving style signal line 13. Furthermore, the central processing unit 4 is connected to a position-detection device 15 which can be formed, for example, by what is referred to as a "GPS". The central processing unit 4 is then supplied via a position signal line 16 with a position signal 17 which represents the local position of the vehicle. In addition, there is a data memory 18 in which three-dimensional maps of the surroundings of the vehicle and, if appropriate, other information, for example speed restrictions, are stored. Such a data memory may be formed, for example, by means of a CD ROM which is inserted into a reading device. The position-detection device 15 is usually equipped straight away with such a data memory 18, for example in order to form a navigation device. The central processing unit 4 thus has access via a data line 19 to the data 20 relating to the surroundings which are stored in the data memory 18.

The method according to the invention for operating the drive train 1 operates as follows:

The driving style input device 12 may be, for example, a switch which can be activated manually and with which a driving style can be selected from a range from minimum energy or fuel consumption up to maximum power output by the driver. Likewise, it may be possible for the manufacturer to predefine a specific driving style so that the driving style input device 12 can be implemented in the central processing unit 4. Likewise, it is possible to determine the desired driving style adaptively in that the central processing unit 4 analyses the driving behaviour of the respective driver of the vehicle during the driving mode and determines a corresponding driving style from the behaviour. To this extent, the driving style input device 12 is then formed from software.

The driver of the vehicle inputs his power request into the system of the drive train 1 by activating the handle 9 or the accelerator pedal 10. The power request input device 8 generates the power request signal 11 as a function of its activation and feeds the power request signal 11 to the central processing unit 4. In the central processing unit 4, a gearbox control signal 21 for actuating the manual gearbox 3 and a drive control signal 22 for actuating the drive unit 2 are then determined. The gearbox control signal 21 corresponds, for example, to a specific gear state of the manual gearbox 3. In contrast thereto, the drive control signal 22 can correspond to a torque request which is fed to a control unit (not shown) of the drive unit 2 so that the control unit can actuate the drive unit 2 to output the desired engine torque. Likewise, it is possible for the function of this engine control unit to be already implemented in the central processing unit 4 so that the drive control signals 22 already comprise the control signals necessary to implement the torque request.

In the determination of the gearbox control signals 21 and the drive control signals 22, the central processing unit 4 takes into account the driving style or the driving style signal 14 and the location of the vehicle or the location signal 17. A driving style of minimum fuel consumption usually results in a different combination of gearbox control signal 21 and drive control signal 22 than that resulting from a driving style of maximum generation of power by the drive train 1. In a corresponding way, the combination of determined gearbox control signals 21 and drive control signals 22 in the case of a flat road differs from that with a road having a positive gradient or negative gradient, which can be determined from the location signal 17 in conjunction with the road data 20.

It is of particular significance that a predictive driving style can be implemented using the location signal 17 and the road data 20 relating to the surroundings. This means that the determination of the gearbox control signals 21 and drive control signals 22 takes into account the surroundings of the vehicle, resulting in increased effectiveness in terms of the desired driving style.

From the location signal 17, in conjunction with the data 20 relating to the surroundings, it is possible, for example, to monitor the distance between the current position of the vehicle and a change in the gradient of the road in order, for example, to suppress an upshift of the manual gearbox 3 at a predetermined distance before the start of a positive gradient or to initiate a downshift of the manual gearbox 3. In a corresponding way, an upshift operation can already be suppressed before the start of a corresponding negative gradient and/or a downshift operation can be initiated, for example in order to reduce wear on the brakes.

A further driving property which can be obtained from the data 20 is, for example, the distance from a change in the direction of the road, for example a bend, which can be travelled through only at a predetermined maximum speed. Correspondingly, when this bend is approached, a request by the driver of the vehicle to increase the speed can be ignored. Likewise, it is possible to initiate a corresponding braking operation at an early time.

In a corresponding way, it is also possible to take into account a change in the permitted speed.

Furthermore, it is possible to modify the power request of the driver of the vehicle. For example, a power request which alternates to a relatively high extent can be smoothed in order to optimize consumption in the central processing unit 4. The degree of accelerations can be limited in accordance with the predefined driving style. Furthermore, it is possible to change the power of the drive unit 2 by means of corresponding drive control signals 22, in particular to increase or decrease the power by changing the parameters. This procedure is usually referred to as increasing or decreasing the parameters of the engine power. For example, it is appropriate to decrease or increase the parameters as a function of the weight of the vehicle. Likewise, during steady-state driving without a positive gradient or in a negative gradient, it appears appropriate to reduce the parameters of the engine power. A brief increase in the parameters of the engine power can be expedient if more engine power is required when travelling up a gradient, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for operating an electronically actuated drive train in a motor vehicle, the method comprising:

determining drive control signals for actuating a drive unit and gearbox control signals for actuating a manual gearbox from a power request of the driver of the vehicle, providing a predefined or predefinable driving style which is used to determine the control signals and can be selected from a range from minimum energy or fuel consumption up to maximum power output, wherein the predefined driving style is defined at the outset of vehicle travel and is not adapted to the driving style of the driver while the driver is driving, taking the predefined driving style into account in the determination of the drive control signals and the gearbox control signals, taking the local position of the motor vehicle into account in the determination of the drive control signals and the gearbox control signals.

2. The method according to claim 1, further comprising, in order to take into account the local position of the motor vehicle, taking at least one of the following steps:

displacing a gear-changing time, smoothing the power request, at least partially ignoring the power request, and even when there is a constant power request, changing the power of the drive unit.

3. The method according to claim 1, wherein the step of taking the local position of the motor vehicle into account includes taking only the local current surroundings of the motor vehicle into account.

4. A method for operating an electronically actuated drive train in a motor vehicle, the method comprising:

determining drive control signals for actuating a drive unit and gearbox control signals for actuating a manual gearbox from a power request of the driver of the vehicle, providing a predefined or predefinable driving style which can be selected from a range from minimum energy or fuel consumption up to maximum power output, taking the driving style into account in the determination of the drive control signals and the gearbox control signals, taking the local position of the motor vehicle into account in the determination of the drive control signals and the gearbox control signals, and wherein the step of taking the local position of the motor vehicle into account includes taking the local position of the motor vehicle into account in conjunction with three-dimensional maps of the current surroundings of the vehicle, including road gradient, in the sense of a predictive driving style in the determination of the drive control signals and the gearbox control signals.

5. The method according to claim 4, further comprising determining characteristic road properties, used in the determination of the drive control signals and the gearbox control signals, from the three-dimensional maps.

6. The method according to claim 5, further comprising taking at least one of the following road properties into account in the determination of the drive control signals and the gearbox control signals:
- a distance from a change in the road gradient,
- a distance from a change in the direction of the road,
- a distance from one of a stopping point, destination or intermediate destination, and
- a distance from a change in a permitted speed.

7. The method according to claim 6, further comprising, in order to take into account the local position of the motor vehicle, taking at least one of the following steps:
- displacing a gear-changing time,
- smoothing the power request,
- at least partially ignoring the power request, and
- even when there is a constant power request, changing the power of the drive unit.

8. The method according to claim 5, further comprising, in order to take into account the local position of the motor vehicle, taking at least one of the following steps:
- displacing a gear-changing time,
- smoothing the power request,
- at least partially ignoring the power request, and
- even when there is a constant power request, changing the power of the drive unit.

9. The method according to claim 4, further comprising, in order to take into account the local position of the motor vehicle, taking at least one of the following steps:
- displacing a gear-changing time,
- smoothing the power request,
- at least partially ignoring the power request, and
- even when there is a constant power request, changing the power of the drive unit.

10. The method according to claim 4, further comprising, in order to take into account the local position of the motor vehicle, taking at least one of the following steps:
- displacing a gear-changing time,
- smoothing the power request,
- at least partially ignoring the power request, and
- even when there is a constant power request, changing the power of the drive unit.

11. The method according to claim 4, wherein the step of taking the local position of the motor vehicle into account includes taking only the local current surroundings of the motor vehicle into account.

12. An electronically actuated drive train in a motor vehicle, comprising:
- a manual gearbox which can be actuated by gearbox control signals,
- a drive unit which can be actuated by drive control signals,
- a power request input device which can be activated by the driver of the vehicle and which generates power request signals,
- a position-detection device which determines the local position of the motor vehicle,
- a driving style input device which predefines or can predefine a driving style which is used to determine the control signals and can be selected from a range from minimum energy or fuel consumption up to maximum power output, wherein the predefined driving style is defined at the outset of vehicle travel and is not adapted to the driving style of the driver while the driver is driving, and
- a central processing unit which receives the power request signals, the predefined driving style and the vehicle position, determines the drive control signals and the gearbox control signals, and actuates the manual gearbox and the drive unit.

13. The drive train according to claim 12, wherein the central processing unit determines the drive control signals and the gearbox control signals based on only the local current surroundings of the motor vehicle.

14. An electronically actuated drive train in a motor vehicle, comprising:
- a manual gearbox which can be actuated by gearbox control signals,
- a drive unit which can be actuated by drive control signals,
- a power request input device which can be activated by the driver of the vehicle and which generates power request signals,
- a position-detection device which determines the local position of the motor vehicle,
- a driving style input device which predefines or can predefine a driving style which can be selected from a range from minimum energy or fuel consumption up to maximum power output,
- a central processing unit which receives the power request signals, the driving style and the vehicle position, determines the drive control signals and the gearbox control signals, and actuates the manual gearbox and the drive unit, and
- wherein a data memory is provided in which three-dimensional maps of the surroundings of the vehicle, including road gradient, are stored, the central processing unit determining the current surroundings of the vehicle using the vehicle position and taking into account the surroundings in the determination of the drive control signals and the gearbox control signals in the sense of a predictive driving style.

15. The drive train according to claim 14, wherein the central processing unit determines the drive control signals and the gearbox control signals based on only the local current surroundings of the motor vehicle.

* * * * *